(12) United States Patent
Smitterberg et al.

(10) Patent No.: US 12,319,222 B2
(45) Date of Patent: *Jun. 3, 2025

(54) AIRBAG ASSEMBLY INCLUDING DEPLOYABLE PANEL

(71) Applicant: Ford Global Technologies, LLC, Dearborn, MI (US)

(72) Inventors: Eric Axel Smitterberg, Berkley, MI (US); Russell Joseph Mihm, Beverly Hills, MI (US); Johnathan Andrew Line, Northville, MI (US); Chuck R. Reese, Northville, MI (US); James Robert Chascsa, II, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,345

(22) Filed: Jan. 31, 2024

(65) Prior Publication Data
US 2024/0166160 A1     May 23, 2024

Related U.S. Application Data

(62) Division of application No. 18/051,947, filed on Nov. 2, 2022, now Pat. No. 12,012,064.

(51) Int. Cl.
*B60R 21/2338* (2011.01)
*B60R 21/16* (2006.01)
*B60R 21/205* (2011.01)

(52) U.S. Cl.
CPC ........ *B60R 21/2338* (2013.01); *B60R 21/205* (2013.01); *B60R 2021/161* (2013.01); *B60R 2021/23386* (2013.01)

(58) Field of Classification Search
CPC .............. B60R 21/2338; B60R 21/205; B60R 2021/161; B60R 2021/23386
See application file for complete search history.

(56) References Cited

U.S. PATENT DOCUMENTS

| 5,588,674 A | 12/1996 | Yoshimura et al. |
| 6,364,351 B1 | 4/2002 | Hier et al. |
| (Continued) | | |

FOREIGN PATENT DOCUMENTS

| CN | 1449952 A | 10/2003 |
| DE | 10163686 A1 | 7/2003 |
| (Continued) | | |

OTHER PUBLICATIONS

KR-20020068795-A (machine translation) (Year: 2002).*

*Primary Examiner* — Jason D Shanske
*Assistant Examiner* — Joselynn Y Sliteris
(74) *Attorney, Agent, or Firm* — Frank A. MacKenzie; Brooks Kushman P.C.

(57) ABSTRACT

An assembly includes a dash and a deployable panel supported by the dash. The deployable panel is moveable relative to the dash from an undeployed position to a deployed position. The deployable panel has a proximal end at the dash in the deployed position and a distal end spaced above the dash in the deployed position. An airbag is supported by the dash and is inflatable to an inflated position. The airbag abuts the deployable panel when the deployable panel is in the deployed position and the airbag is in the inflated position. A tether extends from the airbag to the deployable panel in the undeployed position.

14 Claims, 14 Drawing Sheets

(56) References Cited

U.S. PATENT DOCUMENTS

| | | |
|---|---|---|
| 6,435,554 B1 | 8/2002 | Feldman |
| 6,616,182 B2 | 9/2003 | Woolley et al. |
| 6,688,640 B1 | 2/2004 | Davis, Jr. et al. |
| 7,354,060 B2 | 4/2008 | Thomas |
| 7,540,531 B2 | 6/2009 | Sakakibara et al. |
| 7,594,674 B1 | 9/2009 | Biondo et al. |
| 7,874,578 B2 | 1/2011 | Thomas et al. |
| 8,376,395 B2 | 2/2013 | Ory |
| 8,408,588 B2 | 4/2013 | Wittkamp |
| 8,657,328 B2 | 2/2014 | Ory |
| 8,888,125 B2 | 11/2014 | Ory |
| 9,415,741 B2 | 8/2016 | Yokota et al. |
| 10,077,020 B2 | 9/2018 | Raikar et al. |
| 10,457,241 B2 | 10/2019 | Weerappuli |
| 10,864,876 B2 | 12/2020 | Malapati et al. |
| 10,946,825 B2 | 3/2021 | Ghannam et al. |
| 11,052,855 B2 | 7/2021 | Malapati et al. |
| 11,059,445 B2 | 7/2021 | Malapati et al. |
| 11,167,716 B2 | 11/2021 | Tay et al. |
| 11,247,632 B2 | 2/2022 | Malapati et al. |
| 11,299,122 B2 | 4/2022 | Choi |
| 11,447,089 B2 | 9/2022 | Deutschmann et al. |
| 11,643,041 B2 | 5/2023 | Suzuki et al. |
| 11,872,949 B2 * | 1/2024 | Nakanishi ............. B60R 21/205 |
| 11,891,009 B1 * | 2/2024 | Smitterberg ........ B60R 21/2165 |
| 2004/0174003 A1 | 9/2004 | Dominissini |
| 2011/0285115 A1 | 11/2011 | Putala et al. |
| 2014/0265269 A1 | 9/2014 | Fischer et al. |
| 2022/0144202 A1 | 5/2022 | Morita et al. |
| 2023/0132711 A1 | 5/2023 | Nakanishi |

FOREIGN PATENT DOCUMENTS

| | | | |
|---|---|---|---|
| DE | 10023651 B4 | | 8/2008 |
| DE | 10325932 B4 | | 4/2019 |
| KR | 20010059088 A | | 7/2001 |
| KR | 20020068795 A | * | 8/2002 |

* cited by examiner

AIRBAG ASSEMBLY INCLUDING DEPLOYABLE PANEL

CROSS-REFERENCE TO RELATED APPLICATION

This patent application is a divisional application of and claims priority to U.S. Pat. No. 12,012,064 filed on Nov. 2, 2022, which is hereby incorporated by reference in its entirety.

BACKGROUND

A vehicle may include one or more airbags inflatable during certain vehicle impacts to control kinematics of occupants inside the vehicle. The airbag may be a component of an airbag assembly including a housing supporting the airbag. The airbag assembly includes an inflation device in communication with the airbag for inflating the airbag from an uninflated position to an inflated position. The airbag inflatable by the inflation device is positioned to abut the windshield or side windows when in the inflated position.

DETAILED DESCRIPTION

Figure 1:
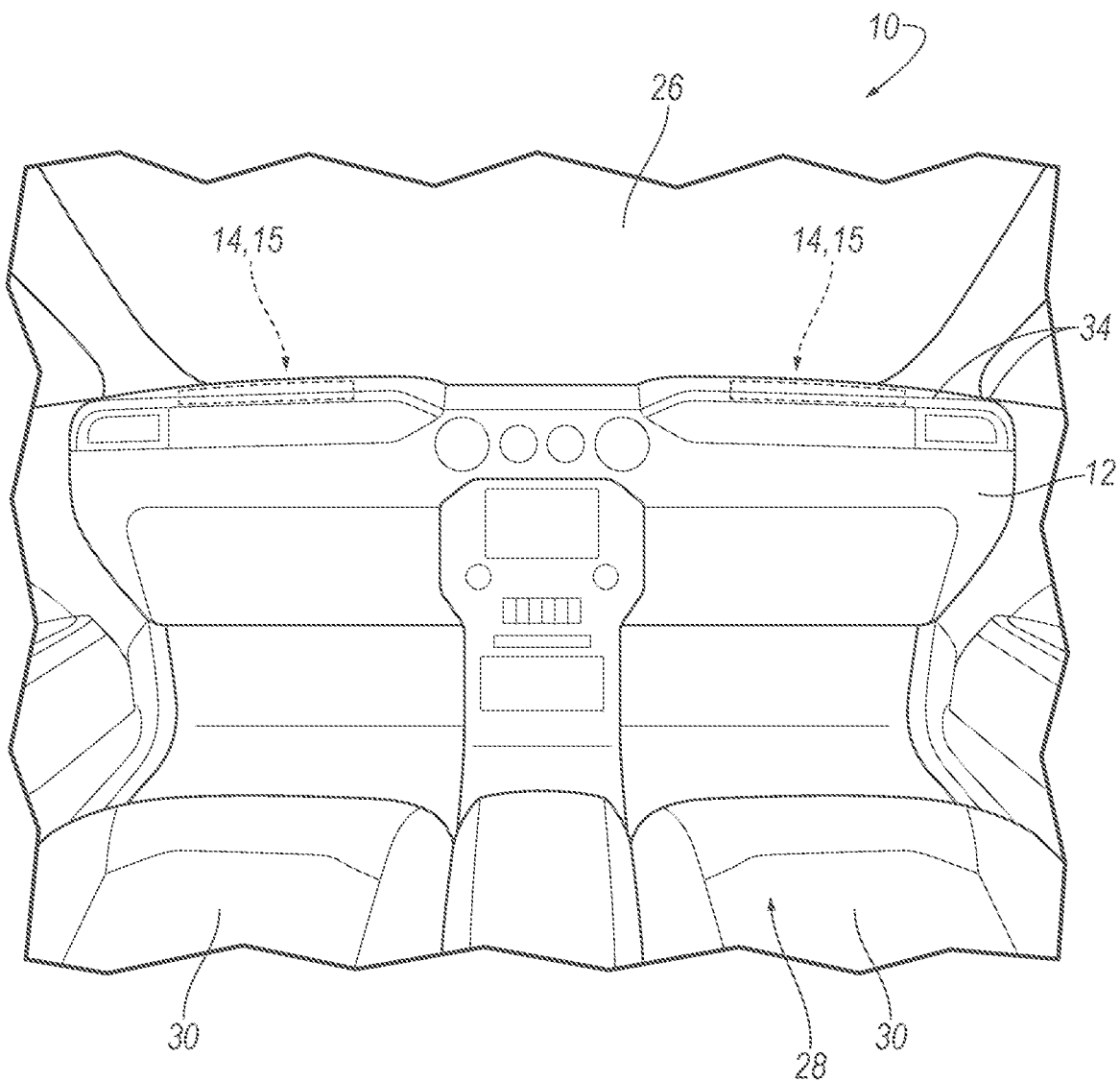
FIG. 1 is a perspective view of an interior of a vehicle with two deployable panel assemblies each in an undeployed position.

An assembly including a dash and a deployable panel supported by the dash. The deployable panel is moveable relative to the dash from an undeployed position to a deployed position. The deployable panel has a proximal end at the dash in the deployed position and a distal end spaced above the dash in the deployed position. An airbag is supported by the dash and is inflatable to an inflated position. The airbag abuts the deployable panel when the deployable panel is in the deployed position and the airbag is in the inflated position. A tether extends from the airbag to the deployable panel in the undeployed position.

The tether may be flexible relative to the deployable panel.

The tether may be fabric.

The tether may be positioned to transmit upward force from the airbag to the deployable panel to raise the deployable panel toward the deployed position as the airbag inflates to the inflated position.

The tether may be connected to the distal end of the deployable panel.

The deployable panel in the deployed position may be rigid relative to the airbag in the inflated position.

The tether may be frangible relative to the deployable panel and/or the airbag between the undeployed position and the deployed position of the deployable panel.

The assembly may include a track supported by the dash, the deployable panel being slideably engaged with the track and moveable along the track from the undeployed position to the deployed position. The track may be elongated upright. The track may limit movement of the deployable panel to translation from the undeployed position to the deployed position. The assembly may include a lock between the track and the deployable panel that locks the deployable panel to the track when the deployable panel is in the deployed position. The lock may include a spring-loaded pin on one of the track or the deployable panel and a hole on the other of the track or the deployable panel, the hole receiving the spring-loaded pin when the deployable panel is in the deployed position.

The deployable panel may translate from the undeployed position to the deployed position.

The assembly may include a windshield, the deployable panel being between the airbag and the windshield.

The deployable panel may include a wedge at the distal end that wedges into the track when the deployable panel is in the deployed position.

The distal end and the proximal end of the deployable panel may be adjacent the dash in the undeployed position.

The distal end may rotate about the proximal end from the undeployed position to the deployed position.

The distal end may be fixed to the dash in the undeployed position and the deployed position.

The assembly may include a deployable leg extending from the deployable panel and abutting the dash in the deployed position, the deployable panel is between the airbag and the leg.

With reference to the Figures, wherein like numerals indicate like parts throughout the several views, an assembly includes a dash 12 and a deployable panel 16, 17 supported by the dash 12. The deployable panel 16, 17 is moveable relative to the dash 12 from an undeployed position to a deployed position. The deployable panel 16, 17 has a proximal end 18 at the dash 12 in the deployed position and a distal end 20 spaced above the dash 12 in the deployed position. An airbag 22 is supported by the dash 12 and is inflatable to an inflated position. The airbag 22 abuts the deployable panel 16, 17 when the deployable panel 16, 17 is in the deployed position and the airbag 22 is in the inflated position. A tether 24 extends from the airbag 22 to the deployable panel 16, 17 in the undeployed position.

The deployable panel 16, 17 is in the undeployed position prior to inflation of the airbag 22 to the inflated position, i.e., when the airbag 22 is in an uninflated position. Since the tether 24 extends from the airbag 22 to the deployable panel 16, 17, the airbag 22 moves the deployable panel 16, 17 from the undeployed position toward the deployed position as the airbag 22 inflates from the uninflated position to the inflated position. In the deployed position, the deployable panel 16, 17 guides the direction of inflation of the airbag 22 and acts as a reaction surface 44 for the airbag 22 in the inflated position. This allows for the airbag 22 to be positioned vehicle-rearward of a windshield 26 of the vehicle 10 in a position that does not use the windshield 26 as a reaction surface 44 for the airbag 22. In such an example, this reduces design constraints on the vehicle-forward position of a windshield 26 and/or upward angle of the windshield 26.

One example of the deployable panel 16 is shown in FIGS. 3-9BB in which the deployable panel 16 translates relative to the dash 12 from the undeployed position to the deployed position. Another example of the deployable panel 17 is shown un FIGS. 10-14 in which the deployable panel 17 rotates relative to the dash 12 from the undeployed position to the deployed position.

The vehicle 10 may be any type of passenger or commercial automobile, such as a car, a truck, a sport utility vehicle, a crossover vehicle, a van, a minivan, a taxi, a bus, etc. The vehicle 10 defines a vehicle-longitudinal axis A1, e.g., extending between a front and a rear of the vehicle. The vehicle 10 defines a cross-vehicle axis A2, e.g., extending between a left side and a right side of the vehicle. The vehicle 10 defines a vehicle-vertical axis A3, e.g., extending between a top and a bottom of the vehicle. The vehicle-longitudinal axis A1, the cross-vehicle axis A2, and the vehicle-vertical axis A3 are perpendicular to each other. The top, bottom, front, rear, left and right sides, and relative directions used herein (such as vehicle-forward, vehicle-rearward, upward, downward, etc.) may be relative to an orientation of an occupant of the vehicle. The top, bottom, front, rear, left and right sides, and relative directions used herein may be relative to an orientation of controls for operating the vehicle 10 and a driving direction of the vehicle 10 when wheels of the vehicle 10 are straight and the vehicle 10 is powered.

Figure 2:
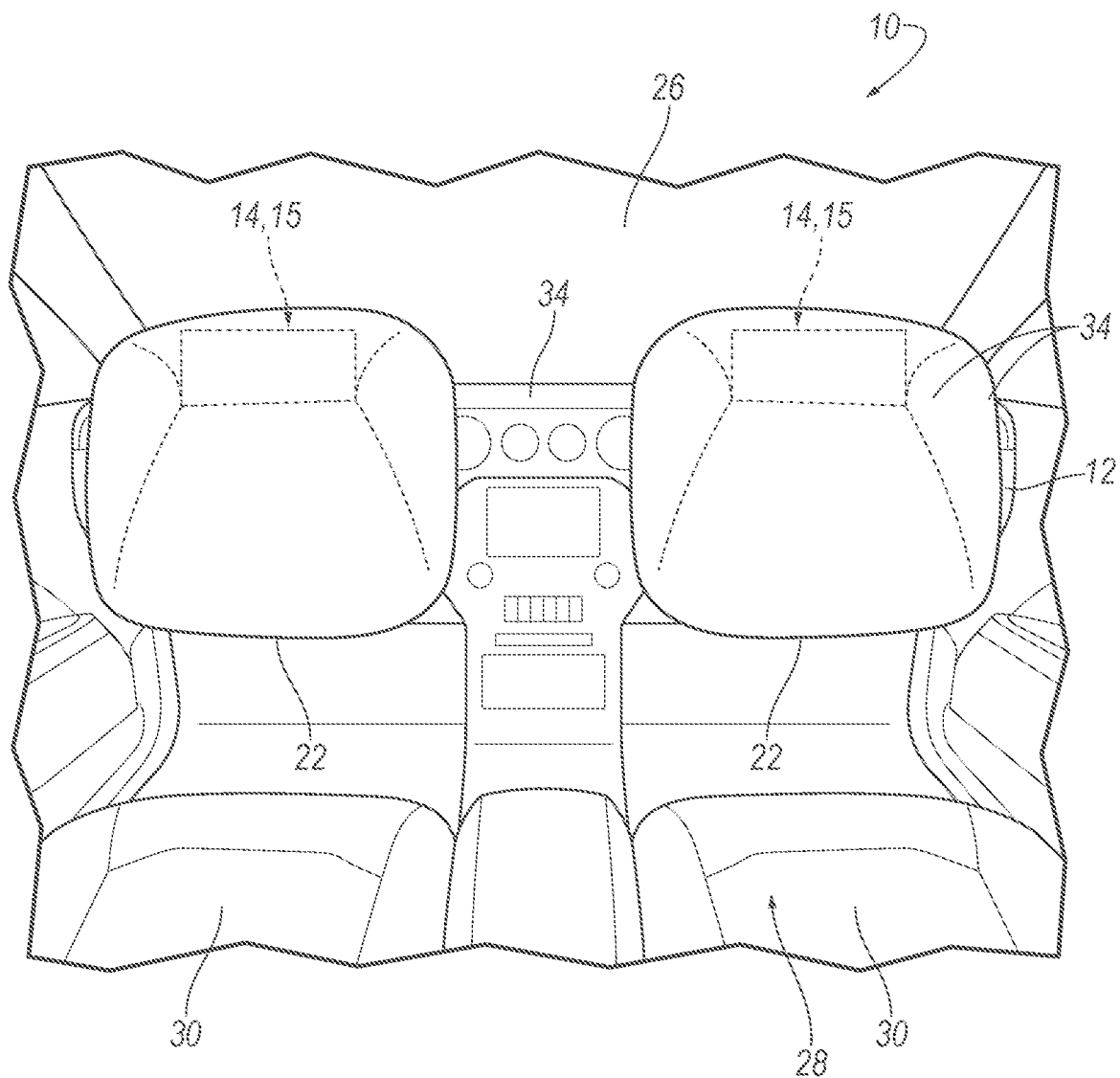
FIG. 2 is a perspective view of an interior of a vehicle with the two deployable panel assemblies each in a deployed position.

With reference to FIGS. 1-2, the vehicle 10 includes a passenger cabin 28. The passenger cabin 28 includes one or more seats 30. The seats 30 are shown as bucket seats and in other examples the seats 30 may be other types, such as bench seats. The seats 30 may face the dash 12. In other words, a seat bottom of the seat 30 may extend from a seatback of the seat 30 toward the dash 12.

The dash 12 may be disposed at a forward end of the passenger cabin 28 and may face toward the seats 30. The dash 12 is located inside of the passenger cabin 28. The dash 12 is elongated about an axis A, and more specifically, may be elongated along the cross-vehicle axis A2. The dash 12 may extend from one side of the vehicle 10 to the other side of the vehicle, i.e., across the passenger compartment in a cross-vehicle direction. For example, the dash 12 may extend from one hinge pillar to another hinge pillar.

In some examples, the dash 12 may include one or more instruments, such as gauges, displays, etc., i.e., may be an instrument panel. The dash 12 may include vehicle 10 controls, such as a steering wheel, a touch screen interface, button, nobs, switches, heating and ventilation equipment; a radio and other electronics; etc. The dash 12, as well as the rest of the vehicle, may lack a steering wheel and may lack pedals for accelerating and braking. In other words, as shown in the Figures, no steering wheel or pedals for accelerating and braking are supported by or adjacent to the dash 12. More specifically, the vehicle 10 does not include a steering wheel or pedals for accelerating and braking, e.g., the vehicle 10 is autonomous. The dash 12 may, for example, be flat in the cross-vehicle direction. In other words, the dash 12 may be generally planar. In some examples, the dash 12 may also be called a bulkhead or an instrument panel.

Figure 3:
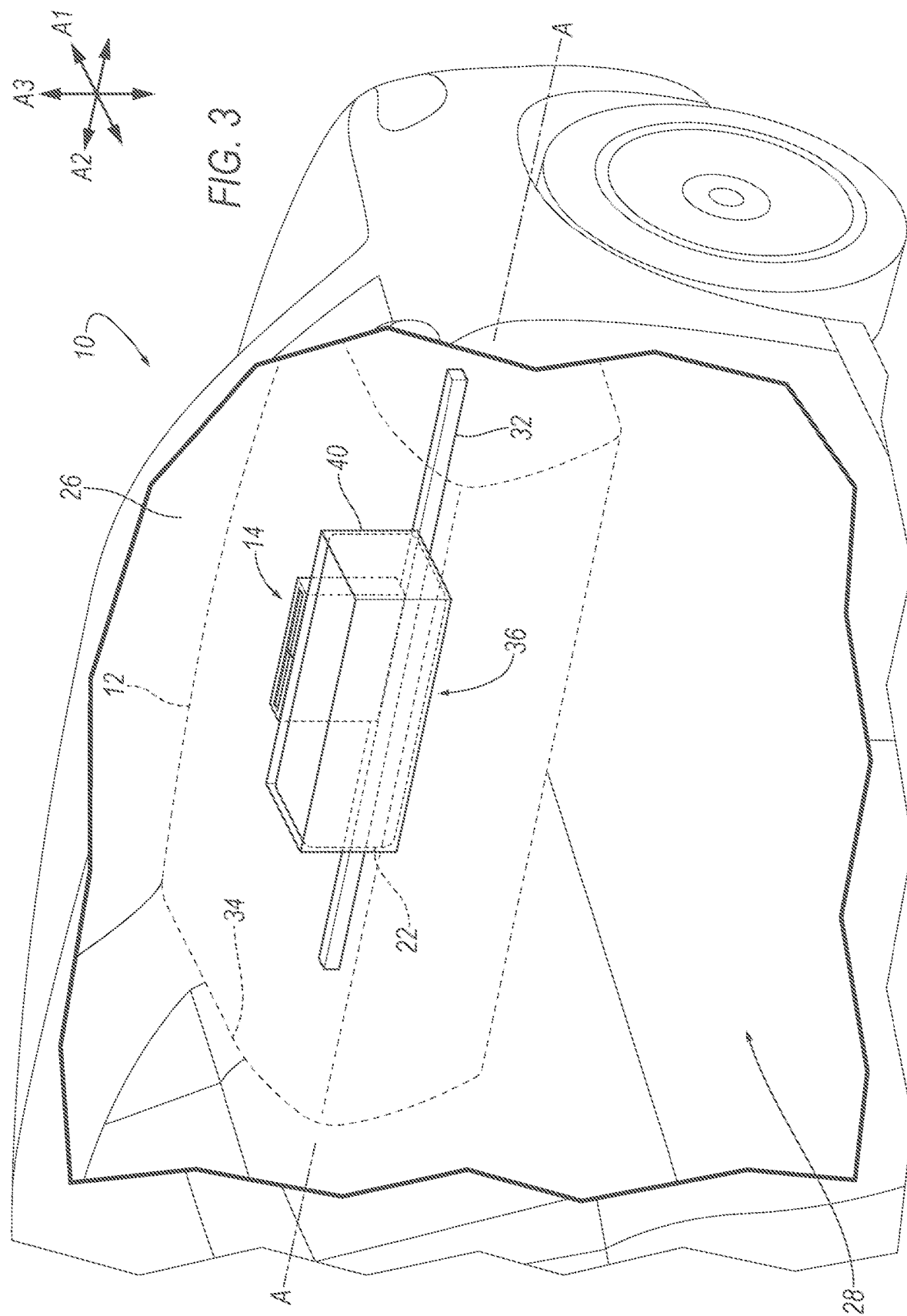
FIG. 3 is a perspective view an example of the deployable panel assembly in the undeployed position.
Figure 4:
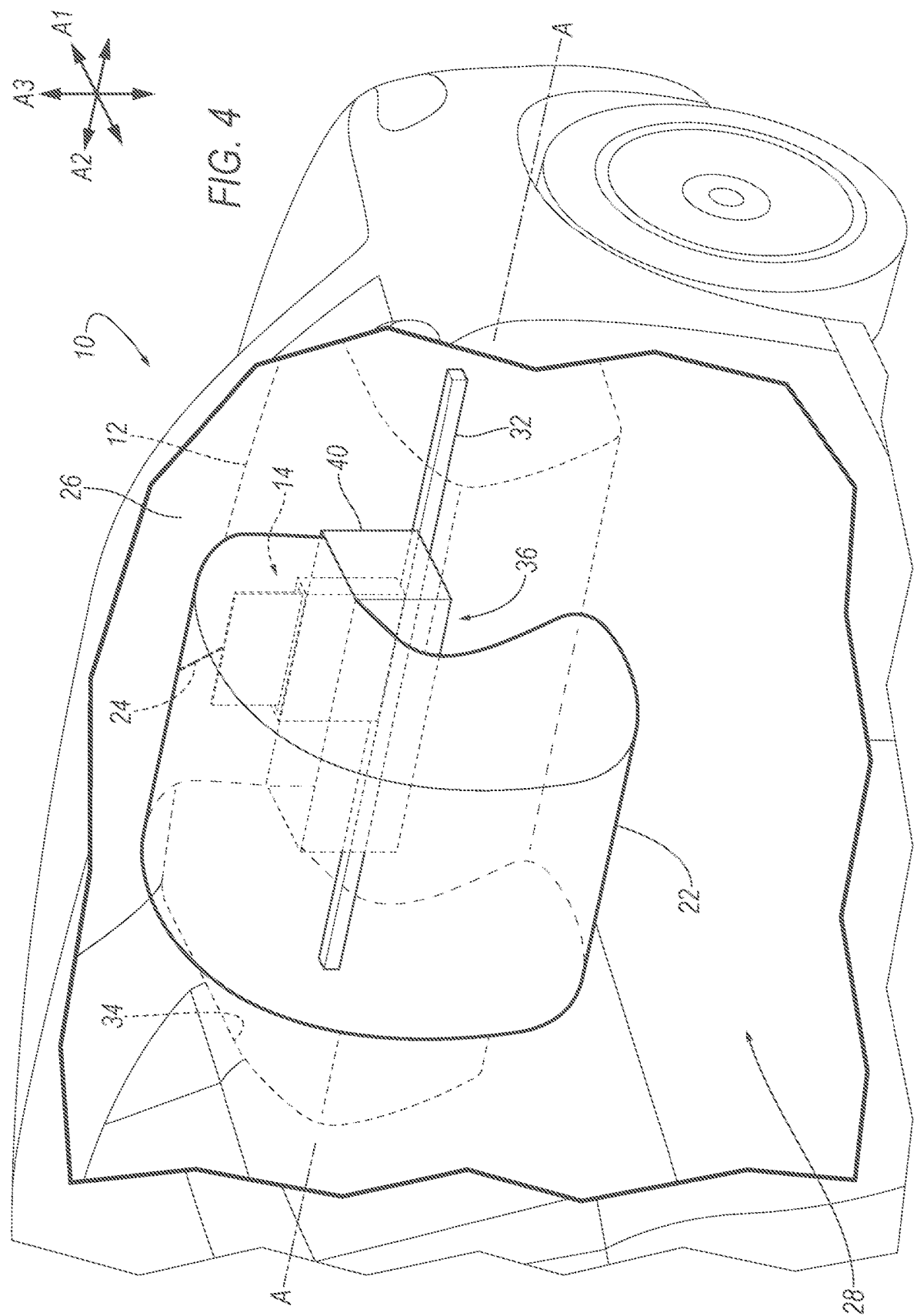
FIG. 4 is a perspective view of the example of FIG. 3 with the deployable panel assembly in the deployed position.

With reference to FIGS. 3-4, the dash 12 may include a frame 32 and a covering 34 supported on the frame 32. The frame 32 of the dash 12 is connected to a body of the vehicle, e.g., with fasteners, brackets, etc. The frame 32 of the dash 12 may be metal, rigid polymer, a composite, or a combination of rigid materials. The frame 32 structurally supports the covering 34 and other components of the dash 12 on the body of the vehicle 10.

The dash 12 may be a structural member of the body of the vehicle, i.e., the frame 32 resists static and dynamic forces from operation of the vehicle 10 without undue deflection or distortion. Examples of forces include a weight of other vehicle 10 components, passengers, and cargo; twisting forces caused by driving over uneven surfaces; torque from a transmission; longitudinal and lateral forces from driving; and possibly forces from certain impact with other vehicles or impactors.

The covering 34 of the dash 12 may conceal the frame 32. The covering 34 is exposed to the passenger cabin 28. Specifically, the covering 34 may have a class-A surface, i.e., a surface specifically manufactured to have a high quality, finished aesthetic appearance free from blemishes. The covering 34 may be vinyl, cloth, leather, faux leather, plastic (such as acrylonitrile butadiene styrene (ABS)), etc., and combinations thereof. The covering 34 may include a substrate and upholstery supported on the substrate, as shown in the examples shown in the Figures.

With reference to FIGS. 1-4, the windshield 26 extends upwardly from the dash 12. Specifically, the windshield 26 may extend from the dash 12 to a roof of the vehicle 10. The windshield 26 is transparent. The windshield 26 may be at the forward end of the passenger cabin 28. The windshield 26 may include a bottom edge and a top edge. The bottom edge may be vehicle-forward forward of the top edge. In other words, the top edge may be between the bottom edge and the seats 30 relative to the vehicle-longitudinal axis A1. In another example, the windshield 26 may be generally vertical. For example, the top edge may be generally vertical of the bottom edge relative to the vehicle-vertical axis A3.

The vehicle 10 includes an airbag assembly 36. The airbag assembly 36 includes the airbag 22 and an inflator 38 and may include an airbag housing 40. The airbag assembly 36 may be positioned to be a passenger airbag assembly 36. In the example shown in the Figures, the vehicle 10 may be an autonomous vehicle without a steering wheel, and in such an example, the vehicle 10 may include two airbag assemblies 36 and corresponding deployable panel assemblies 14, 15, i.e., one in front of the left front seat and another in front of the right front seat. In an example in which the vehicle 10 includes a steering wheel, the vehicle 10 may have one assembly in front of the passenger seat, e.g., the right front seat. Alternatively, the vehicle 10 may have any suitable number of airbag assemblies 40 and corresponding deployable panel assemblies 14, 15 in any suitable position.

The airbag 22 is mounted to the dash 12, e.g., via the airbag assembly 36. Specifically, the airbag housing 40 may be mounted to the frame 32 of the dash 12, e.g., with threaded fasteners, brackets, etc. The airbag assembly 36 houses the airbag 22 in an uninflated position and supports the airbag 22 in the inflated position. The airbag 22 may be rolled and/or folded to fit within the airbag assembly 36 in the uninflated position. The airbag assembly 36 may be of any suitable material, e.g., a rigid polymer, a metal, a composite, or a combination of rigid materials. The airbag assembly 36 may be supported by the dash 12.

The airbag 22 may be a woven polymer or any other material. As one example, the airbag 22 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 5:
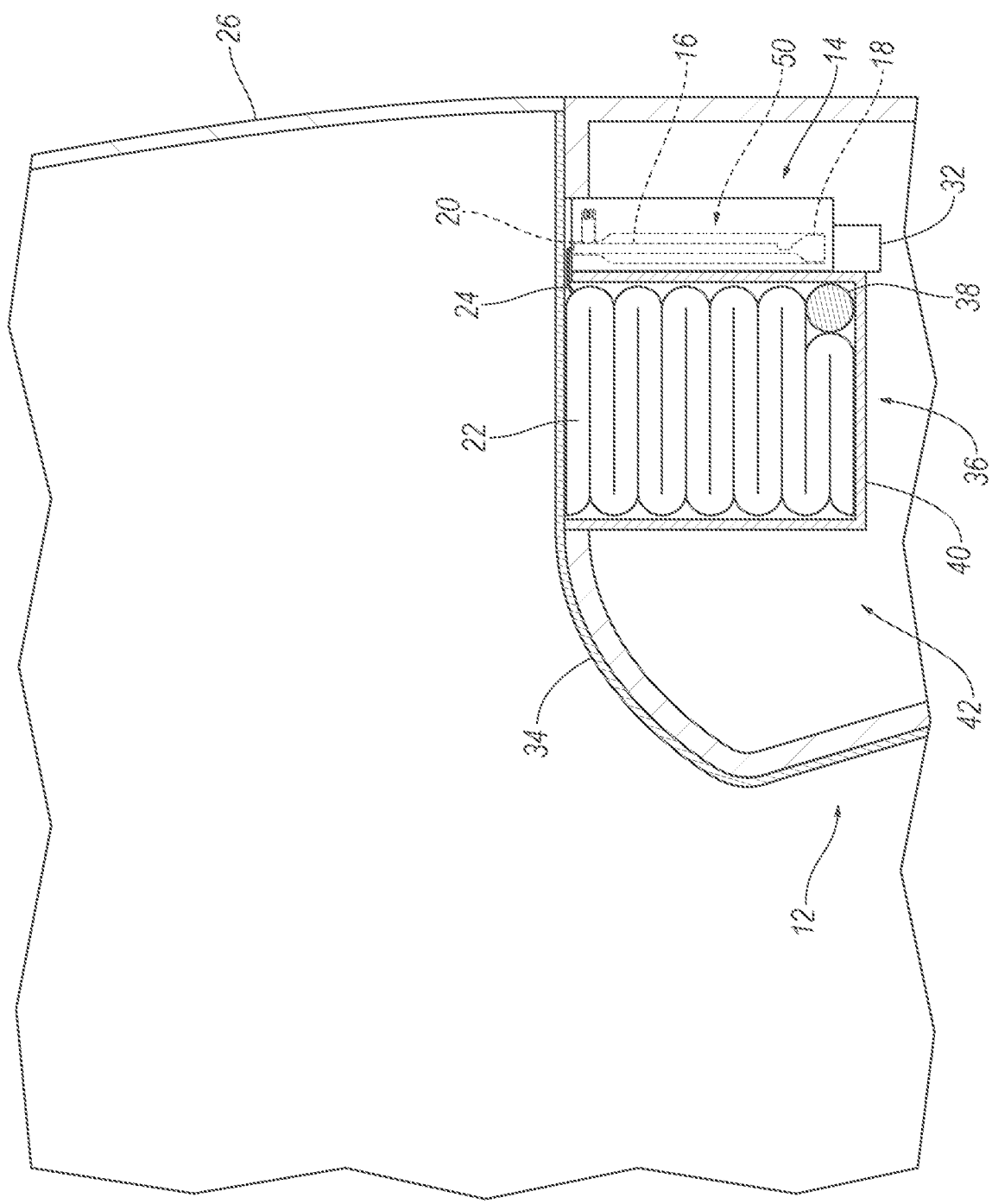
FIG. 5 is a cross-sectional view of a dash and the deployable panel assembly of FIG. 3 in the undeployed position.
Figure 6:
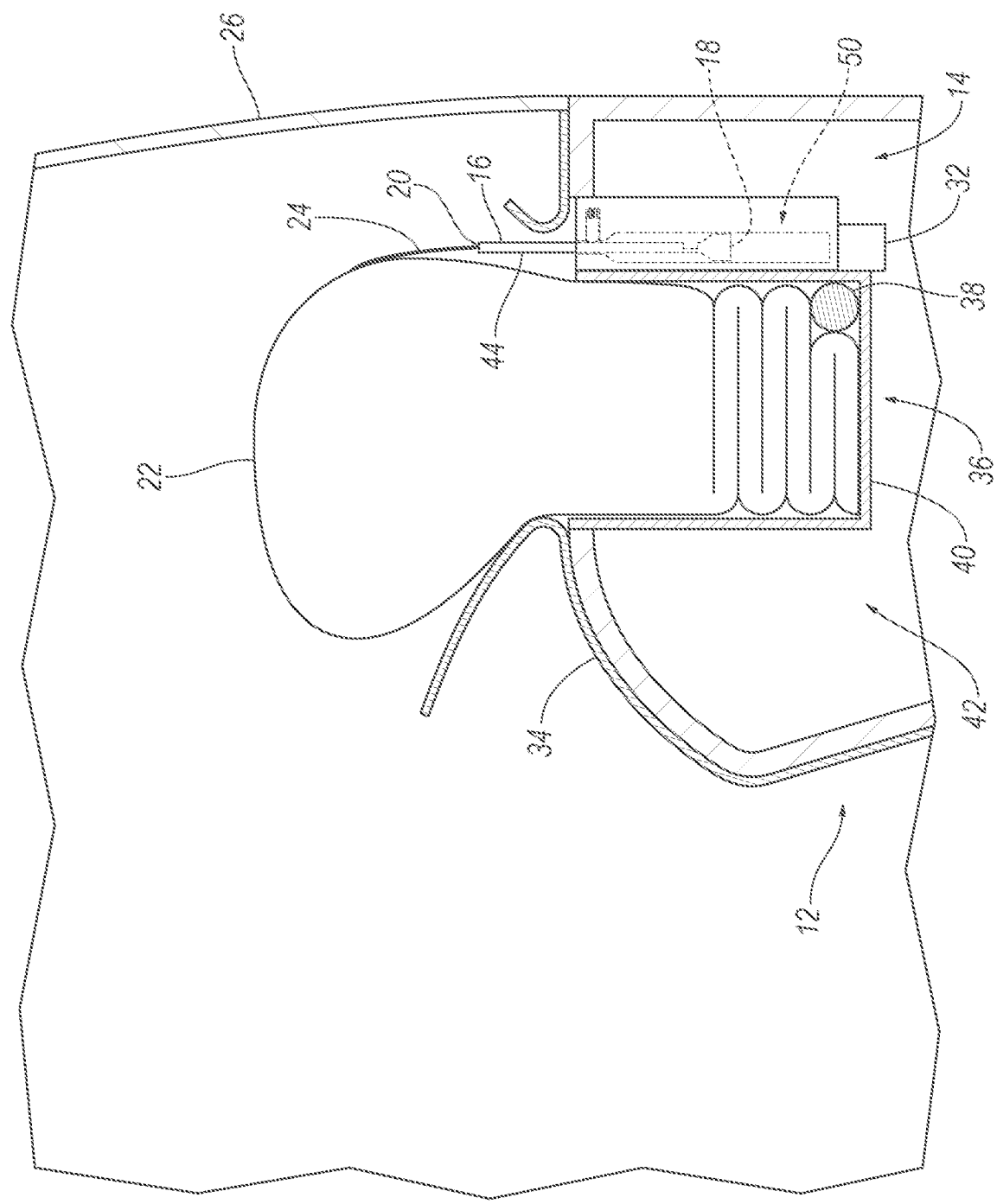
FIG. 6 is the cross-sectional view of FIG. 5 with an airbag partially inflated.
Figure 7:
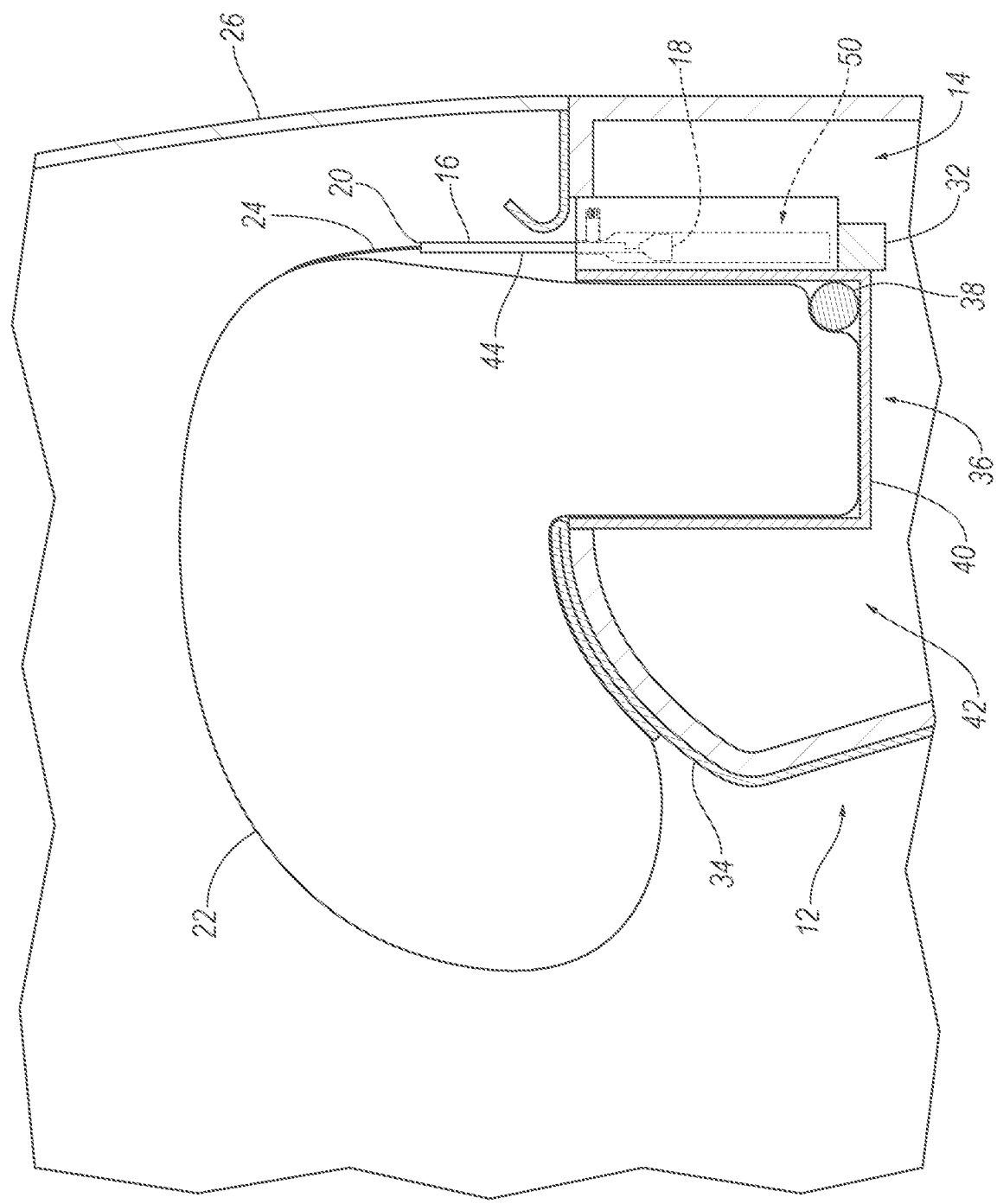
FIG. 7 is the cross-sectional view of FIG. 6 with the airbag further inflated and prior to full unfolding and inflation of the airbag.
Figure 8:
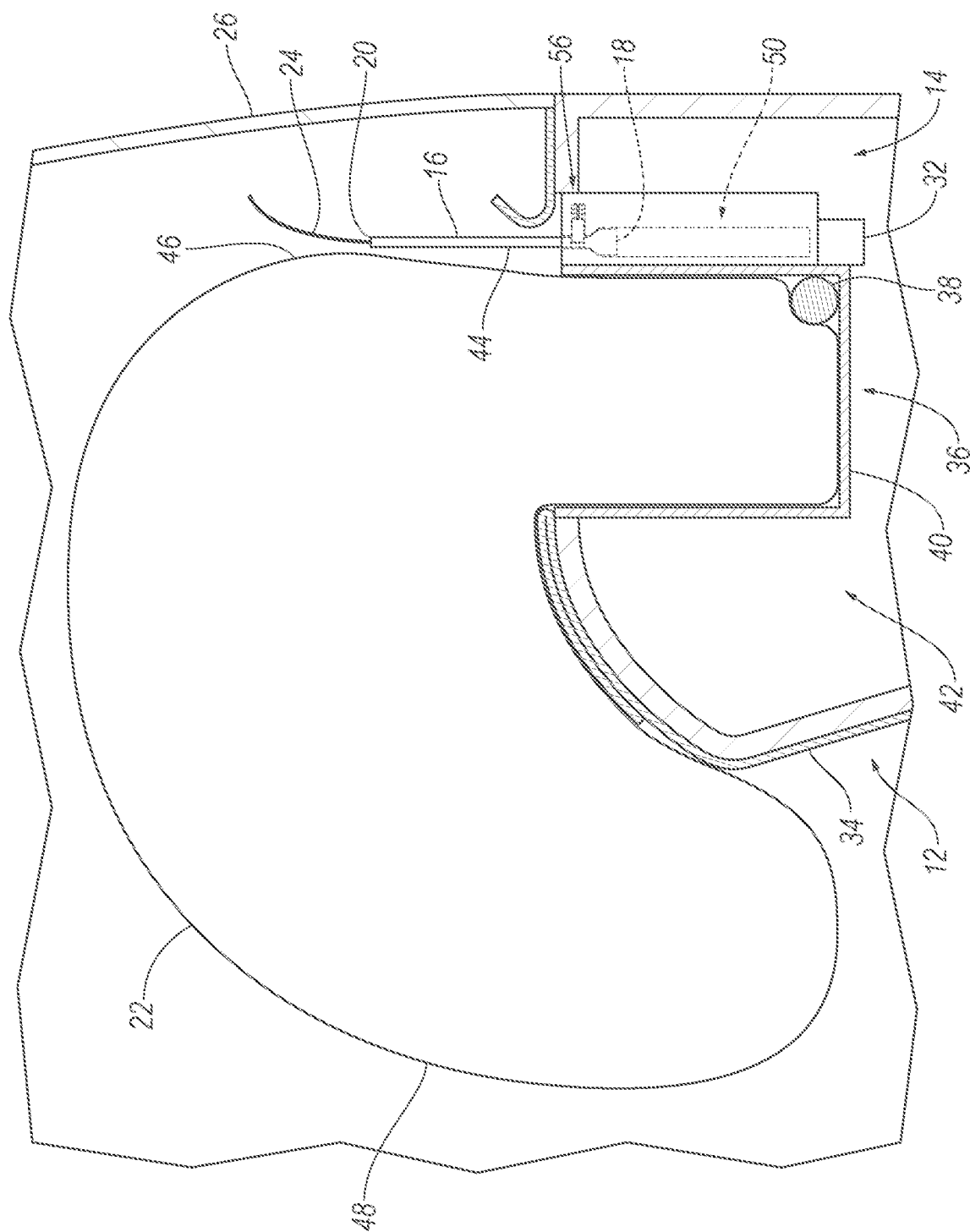
FIG. 8 is the cross-sectional view of FIG. 7 with the airbag in an inflated position and with a tether released between the airbag and a deployable panel.

The inflator 38 is in fluid communication with the airbag 22, e.g., via tubing or other structure to transfer inflation medium from the inflator 38 to the airbag 22. Upon receiving an instruction, such as an electrical pulse, from, e.g., a controller, the inflator 38 may inflate the airbag 22 with an inflatable medium, such as a gas, to the inflated position. The inflator 38 may be, for example, a pyrotechnic inflator 38 that uses a chemical reaction to drive inflation medium to the airbag 22. The inflator 38 may be of any suitable type, for example, a cold-gas inflator 38. The inflator 38 may be supported by the airbag assembly 36 or at any other suitable vehicle 10 location. Inflation of the airbag 22 may tear, separate, or otherwise deform the dash 12 (as shown in FIG. 5).

The vehicle 10 includes a deployable panel assembly 14, 15 including the deployable panel 16, 17 and the tether 24 extending from the deployable panel 16, 17 to the airbag 22. One example of the deployable panel assembly 14 is shown in FIGS. 3-9BB and another example of the deployable panel assembly 15 is shown in FIGS. 10-14.

The deployable panel assembly 14, 15, including the deployable panel 16, 17, is below the covering 34 of the dash 12 when the deployable panel 16, 17 is in the undeployed position. The covering 34 conceals the deployable panel assembly 14, 15, including the deployable panel 16, 17, when the deployable panel 16, 17 is in the undeployed position. The airbag 22 is below the covering 34 and concealed by the covering 34 in the uninflated position. The airbag 22 and the deployable panel 16, 17 move upwardly through the covering 34 as the airbag 22 inflates to the inflated position. Specifically, the airbag 22 pulls the deployable panel 16, 17 to the deployed position as the airbag 22 inflates to the inflated position due to the connection of the airbag 22 and the deployable panel 16, 17 by the tether 24.

In the example shown in the Figures, the deployable panel 16, 17 and the airbag 22 are below the covering 34 of the dash 12 when the deployable panel 16, 17 is in the undeployed position, e.g., in a cavity 42 below the covering 34, as described further below. In such an example, inflation of the airbag 22 and/or deployment of the deployable panel 16, 17 from the undeployed position to the deployed position breaks the covering 34, as shown in the Figures.

The dash 12, and specifically the covering 34 of the dash 12, may include a tear seam that is breakable by the airbag 22 as the airbag 22 inflates to the inflated position. The tear seam is designed to rupture upon inflation of the airbag 22. The tear seam may be weaker than a portion of the covering 34 adjacent the tear seam, e.g., the tear seam may include a perforated line, may be thinner, may be a weaker material, etc. The tear seam is positioned to be ruptured by the airbag 22 during inflation of the airbag 22. Specifically, the tear seam may be adjacent the airbag 22 when the airbag 22 is in the uninflated position.

The deployable panel 16, 17 is supported by the dash 12, i.e. the weight of the deployable panel 16, 17 is borne by the dash 12 in the undeployed position and the deployed position. The deployable panel 16, 17 may be engaged with the dash 12, as described further below.

The dash 12, for example, may include the cavity 42. The deployable panel assembly 14, 15 may be positioned in the cavity 42 when the deployable panel 16, 17 is in the undeployed position and the deployable panel 16, 17 is extendable from the cavity 42 to the deployed position. Specifically, in the example shown in FIGS. 3-9BB, a portion of the deployable panel 16 is retained in the cavity 42 and a portion of the deployable panel 16 extends from the cavity 42 in the deployed position, and in the example shown in FIGS. 10-14, the entire deployable panel 17 is in the cavity 42 in the undeployed position and is entirely external to the cavity 42 in the deployed position. Specifically, the proximal end 18 at the dash 12 in the deployed position and the distal end 20 spaced above the dash 12 in the deployed position. The distal end 20 is above the proximal end 18 in the deployed position and the distal end 20 is distal to the dash 12 relative to the proximal end 18. The airbag assembly 36 may be in the cavity 42 with the deployable panel assembly 14, 15 when the airbag 22 is in the uninflated position and the airbag 22 extends from the cavity 42 in the inflated position.

The deployable panel 16, 17 is moveable relative to the dash 12 between the undeployed position and the deployed position. The deployable panel 16, 17 in the deployed position is between the windshield 26 and the airbag 22 in the inflated position. The deployable panel 16, 17 has a reaction surface 44 that faces generally vehicle-rearward toward the airbag 22 in the inflated position. The airbag 22 abuts the reaction surface 44 when the deployable panel 16, 17 is in the deployed position and the airbag 22 is in the inflated position.

The deployable panel 16, 17 is adjacent the airbag 22. In other words, the deployable panel 16, 17 is positioned such that, when the deployable panel 16, 17 is in the deployed position and the airbag 22 is inflated, the airbag 22 impacts the deployable panel 16, 17 and the deployable panel 16, 17 directs the movement of the airbag 22 during inflation. For example, the reaction surface 44 may be positioned to abut the airbag 22 in the inflated position when the deployable panel 16, 17 is in the deployed position, limiting movement of the airbag 22 toward the windshield 26 and positioning the airbag 22 relative to the dash 12, the seat 30, etc.

The deployable panel 16, 17 is sized and shaped to position to operate as a reaction surface for the airbag 22 to position the airbag 22 relative to the dash 12 in the inflated position. The deployable panel 16, 17 may be in a plane along the cross-vehicle axis A2. For example, the deployable panel 16, 17 may be elongated along the cross-vehicle axis A2.

The deployable panel 16, 17 is rigid relative to the airbag 22. In other words, the deployable panel 16, 17 does not deform or deforms less than the airbag 22 when the airbag 22 is in the inflated position and the deployable panel 16, 17 is in the deployed position. Specifically, the deployable panel 16, 17 guides the inflation of the airbag 22 and the shape and position of the airbag 22 is defined by the deployable panel 16, 17, and specifically the reaction surface 44 of the deployable panel 16, 17. Reaction forces between the airbag 22 and the reaction surface 44 urge the airbag 22 to inflate and/or move transverse to the reaction surface 44. The reaction surface 44 in the deployed position may be between the windshield 26 and the seat 30, e.g., positioning the airbag 22 in the inflated position closer to the seat 30 than if the windshield 26 functioned as a reaction surface 44 for the airbag 22. The deployable panel 16, 17 may be, for example, plastic, metal, or any other suitable material.

The tether 24 extends from the airbag 22 to the deployable panel 16, 17 in the undeployed position. Since the tether 24 extends from the airbag 22 to the deployable panel 16, 17, the airbag 22 moves the deployable panel 16, 17 from the undeployed position toward the deployed position as the airbag 22 inflates from the uninflated position to the inflated position. In the example shown in FIGS. 3-9BB, the tether 24 may release between the airbag 22 and the deployable panel 16, 17 when the deployable panel 16, 17 reaches the deployed position and/or when the airbag 22 reaches the inflated position. In the example shown in FIGS. 10-14, the tether 24 may remain connected to the deployable panel 16, 17 and the airbag 22 when the deployable panel 16, 17 reaches the deployed position and/or when the airbag 22 reaches the inflated position.

The tether 24 is positioned to transmit upward force from the airbag 22 to the deployable panel 16, 17 to raise the deployable panel 16, 17 toward the deployed position as the airbag 22 inflates to the inflated position. For example, the tether 24 is connected to the distal end 20 of the deployable panel 16, 17 to pull the distal end 20 upwardly relative to the dash 12 as the airbag 22 inflates. The tether 24 is connected to the airbag 22 at a location that exerts an upward force from the airbag 22 to the deployable panel 16, 17 as the airbag 22 inflates to the inflated position. As an example, the tether 24 may be connected to a back panel 46 of the airbag 22, as shown in the example of FIGS. 3-9BB. As another example, the tether 24 may be connected to an impact panel 48 of the airbag 22, as shown in the example of FIGS. 10-14.

The tether 24 is connected to the deployable panel 16, 17 (at least in the undeployed position and during movement of the deployable panel 16, 17 toward the deployed position) in any suitable fashion. As an example, the tether 24 may be fastened, adhered, ultrasonically welded, and/or stitched to the deployable panel 16, 17. The tether 24 is connected to the airbag 22 (at least in the undeployed position and during movement of the deployable panel 16, 17 toward the deployed position) in any suitable fashion. As an example, the tether 24 may be stitched, ultrasonically welded, adhered, etc., to the airbag 22.

The tether 24 may be flexible relative to the deployable panel 16, 17. The tether 24, for example, may be fabric. Specifically, the tether 24 may be woven nylon yarn, for example, nylon 6-6. Other examples include polyether ether ketone (PEEK), polyetherketoneketone (PEKK), polyester, etc. The tether 24 may be of the same material type as the airbag 22.

With reference to the example shown in FIGS. 3-9BB, the deployable panel 16 moves in translation from the undeployed position to the deployed position. In translational movement, all parts of the deployable panel 16 move with the same velocity in parallel paths. The deployable panel 16 may translate relative to the dash 12. In other examples, the deployable panel 16 shown in FIGS. 3-9BB may move in combined translation and rotation from the undeployed position to the deployed position.

Specifically, the deployable panel 16 in the example in FIGS. 3-9BB is in the cavity 42 in the undeployed position and a portion of the deployable panel 16 extends from the cavity 42 in the undeployed position. The distal end 20 is spaced above the proximal end 18 in the undeployed position and in the deployed position.

With continued reference to the example shown in FIGS. 3-9B, a track 50 is supported by the dash 12. The track 50 may be unitary with the dash 12, i.e., a single, uniform piece of material with no seams, joints, fasteners, or adhesives holding the track 50 to other components of the dash 12. In other words, the track 50 may be formed together simultaneously as a single continuous unit with other components of the dash 12, e.g., by machining from a unitary blank, molding, etc. As another example, the track 50 and the rest of the dash 12 may be non-unitary, i.e., formed separately and subsequently assembled, e.g., by threaded engagement, adhering, welding, etc.

The deployable panel 16 is slideably engaged with the track 50 and is moveable along the track 50 from the undeployed position to the deployed position. The track 50 may be in the cavity 42. The track 50 is elongated upright. As an example, the track 50 may be elongated vertically.

The track 50 permits translational movement of the deployable panel 16 relative to the dash 12. For example, the track 50 limits movement of the deployable panel 16 to translation from the undeployed position to the deployed position. The track 50 may include an elongated channel in which the deployable panel 16 slides and/or may include other suitable structures, such as rollers, bearings, etc., to permit translational movement of the deployable panel 16.

The deployable panel 16 and/or track 50 may be designed to stop the movement of the deployable panel 16 relative to the dash 12 at the deployed position. For example, in the example shown in FIGS. 3-9BB, the deployable panel 16 includes a wedge 52 that wedges into the track 50 when the deployable panel 16, 17 is in the deployed position. Specifically, the track 50 may include a neck 54 that narrows to engage the wedge 52 as the wedge 52 reaches the deployed position. The engagement of the wedge 52 with the neck 54 stops the deployable panel 16 at the deployed position. The wedge 52 may be at the distal end 20 of the deployable panel 16 and the neck 54 may be at an upper end of the track 50.

Figure 9A:
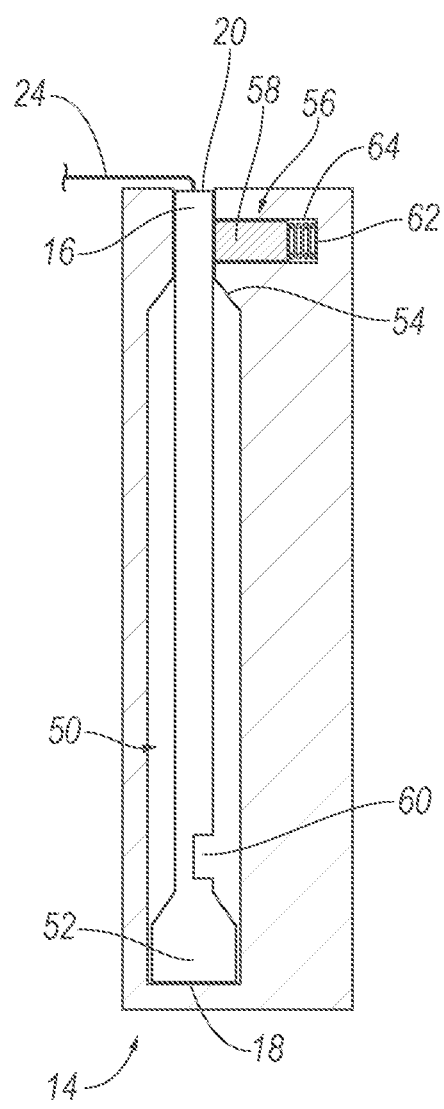
FIG. 9A is a cross-sectional view of the deployable panel assembly of FIG. 3 in the undeployed position.
Figure 9B:
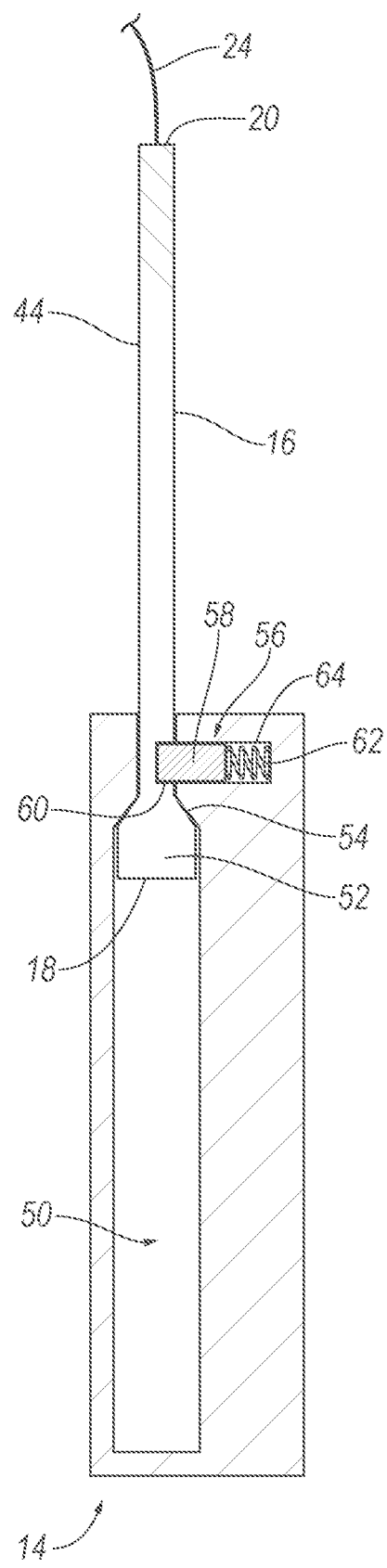
FIG. 9B is a cross-sectional view of the deployable panel assembly of FIG. 9A in the deployed position.
Figure 10:
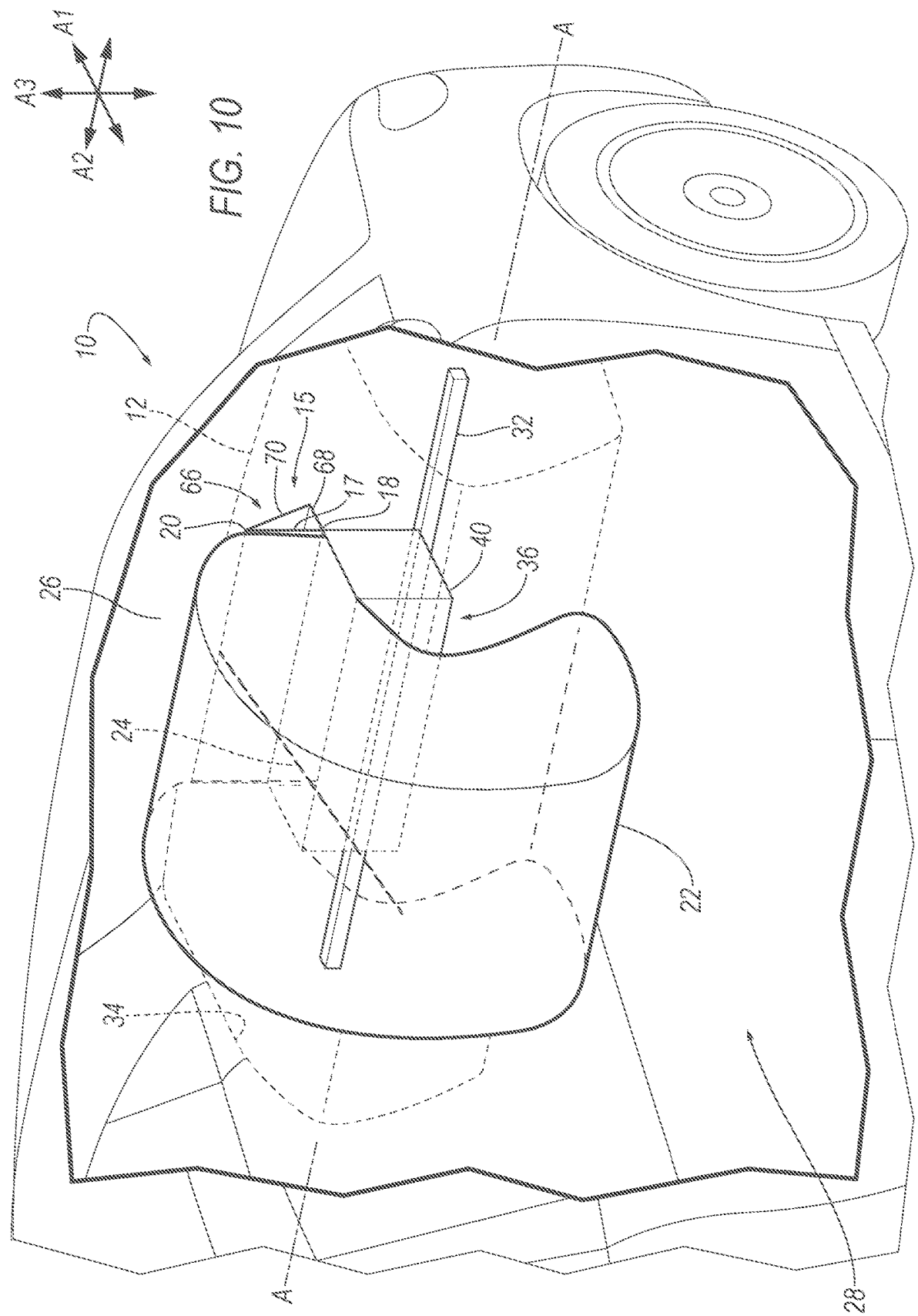
FIG. 10 is another example of the deployable panel assembly in the deployed position.
Figure 11:
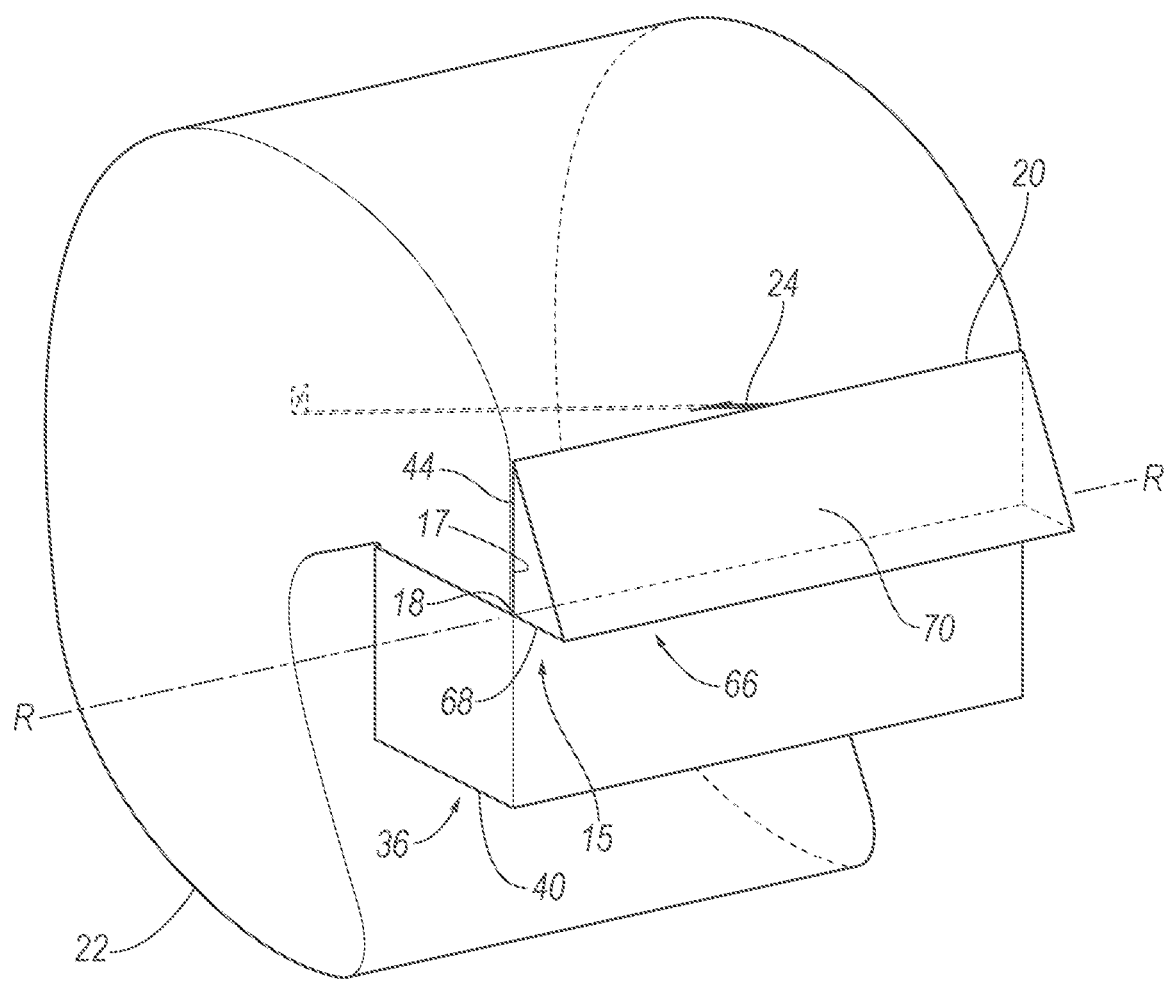
FIG. 11 is another perspective view of the deployable panel assembly in the deployed position.
Figure 12:
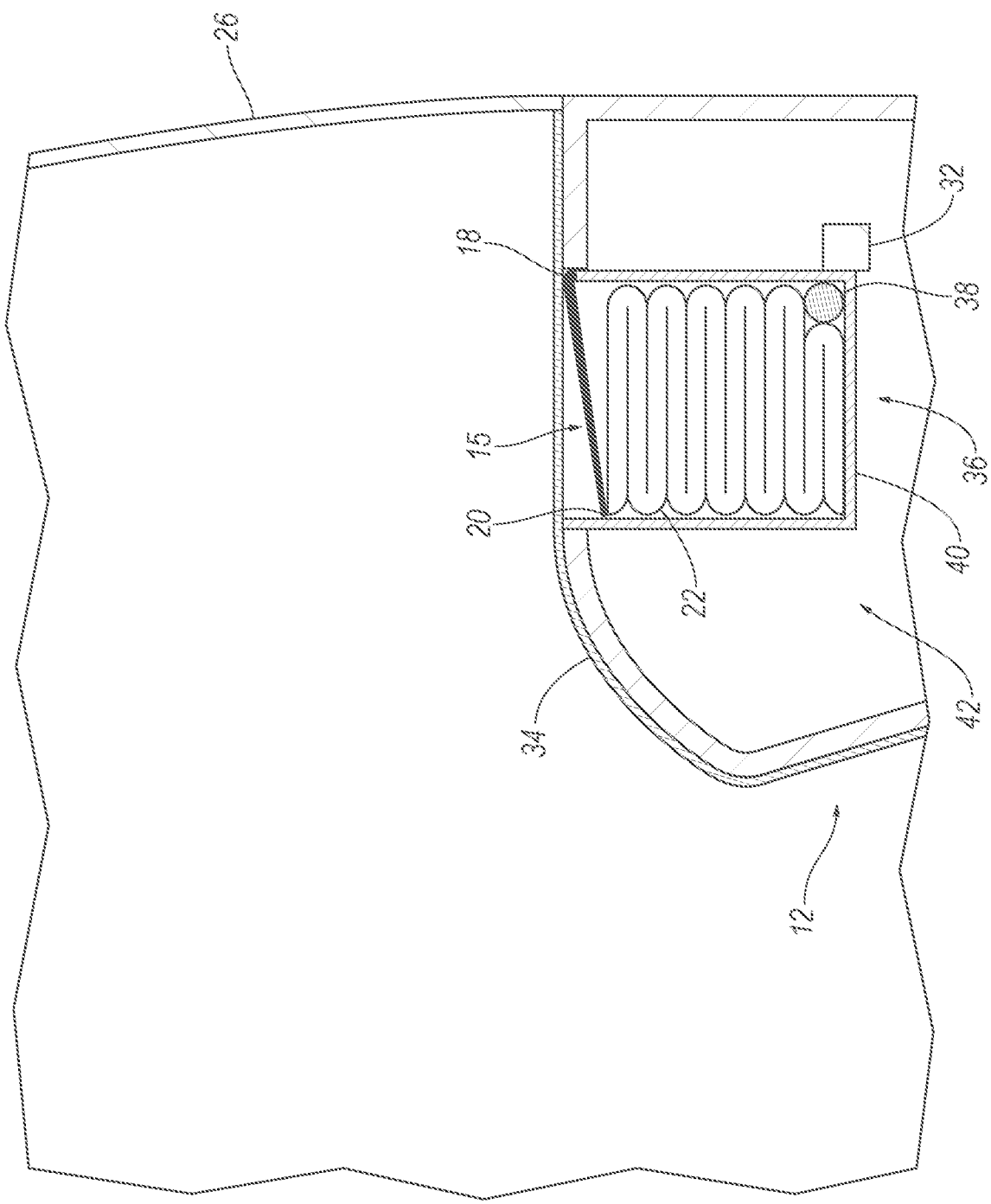
FIG. 12 is a cross-sectional view of a dash and the deployable panel assembly of FIG. 10 in the undeployed position.
Figure 13:
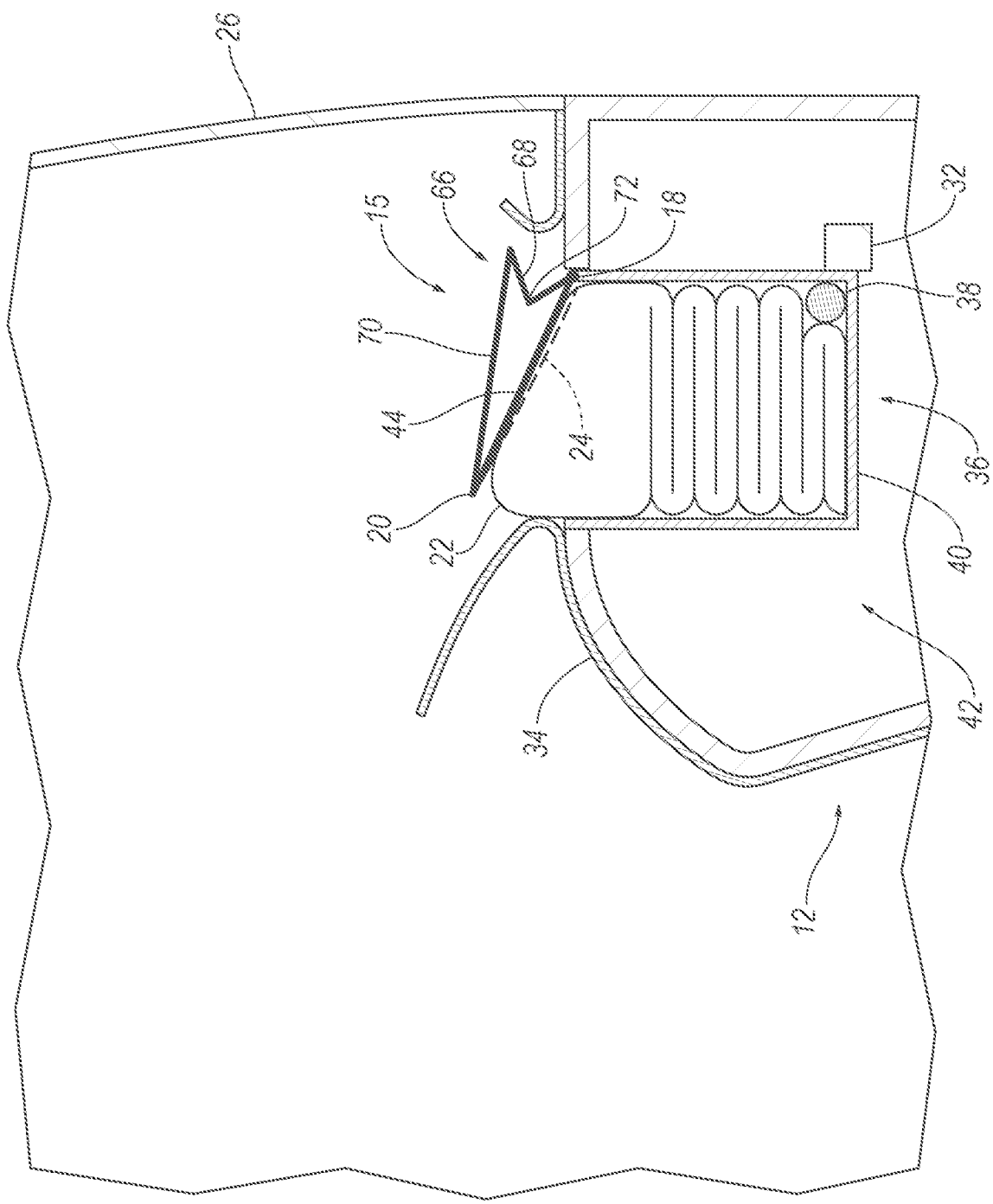
FIG. 13 is the cross-sectional view of FIG. 12 with an airbag partially inflated.
Figure 14:
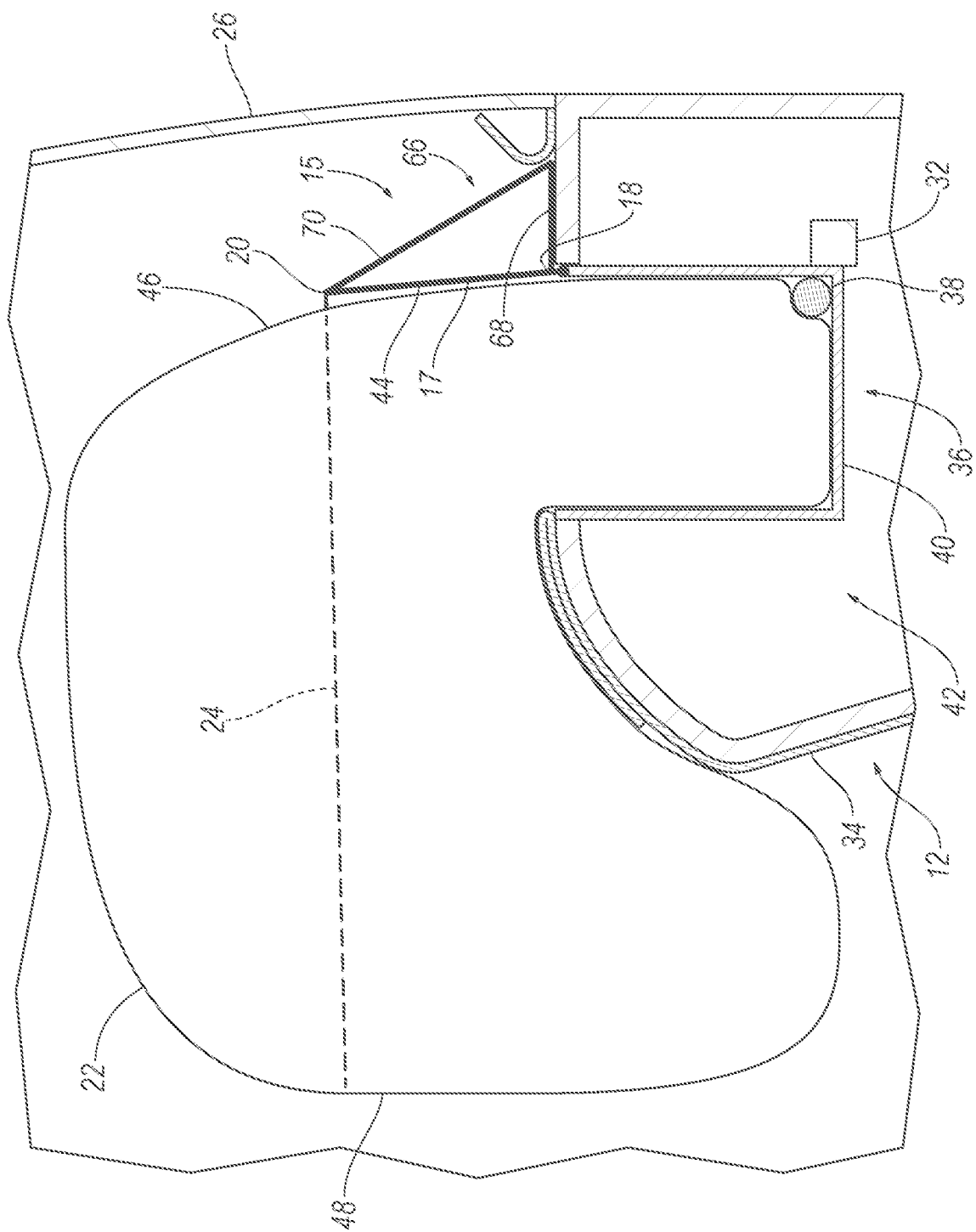
FIG. 14 is the cross-sectional view of FIG. 13 with the airbag in an inflated position and with a deployable leg abutting the dash.

The deployable panel assembly 14 may include a lock 56 between the track 50 and the deployable panel 16, 17. The lock 56 locks the deployable panel 16 to the track 50 when the deployable panel 16 is in the deployed position. As shown in FIGS. 9A-B, the lock 56 may include a spring-loaded pin 58 on one of the track 50 or the deployable panel 16 and a hole 60 on the other of the track 50 or the deployable panel 16. In the example shown in FIGS. 9A-B, the spring-loaded pin 58 is on the track 50, i.e., with a spring 62 retained in a cavity 64 of the track 50, and the hole 60 is on the deployable panel 16. In that example, the pin 58 abuts the deployable panel 16, 17 and the deployable panel 16 depresses the pin 58 into the cavity 42. The pin 58 rides along the deployable panel 16 upwardly as the airbag 22 pulls the deployable panel 16 upwardly. When the pin 58 reaches the hole 60, the spring 62 biases the pin 58 into the hole 60 to prevent the deployable panel 16, 17 from falling, e.g., under the force of gravity and/or rebound forces from deploying, when the deployable panel 16 is in the deployed position. The hole 60 receives the spring-loaded pin 58 when the deployable panel 16 is in the deployed position.

The tether 24 may be frangible relative to the deployable panel 16, 17 and/or the airbag 22 at the deployed position of the deployable panel 16, 17 (as shown in the example deployable panel assembly 14 of FIGS. 3-9B). Specifically, the tether 24 may separate from the airbag 22 and/or the deployable panel 16, 17 when the panel is at the deployed position. The breakage of the tether 24 allows the airbag 22 to further inflate and assume a designed shape without interference from the tether 24. As an example, the tether 24 may be designed to release the airbag 22 from the deployable panel 16, 17 under forces associated with the inflation of the airbag 22 when the wedge 52 engages the neck 54. Specifically, the engagement of the wedge 52 with the neck 54 resists further upward movement of the deployable panel 16 relative to the dash 12 and the tether 24 is designed to release the airbag 22 before breakage of wedge 52 and neck 54. For example, the tether 24 may be sized, shaped, and/or of a material type that break between the airbag 22 and the deployable panel 16, 17 when the deployable panel 16, 17 is in the deployed position and the airbag 22 continues to inflate. As another example, the tether 24 may include an area of weakness (e.g., perforations, a thinned section, etc.) that breaks when the deployable panel 16, 17 is in the deployed position and the airbag 22 continues to inflate. As another example, the connection of the tether 24 to the airbag 22 and/or to the deployable panel 16, 17 may be designed to separate (e.g., release of stitching, release of adhesive, etc.) when the deployable panel 16, 17 is in the deployed position and the airbag 22 continues to inflate.

With reference to FIGS. 10-14, the deployable panel 17 may rotate from the undeployed position to the deployed position. Specifically, the deployable panel 17 is rotatable about the proximal end 18 from the undeployed position to the deployed position. The proximal end 18 is engaged with the dash 12 in the deployed position and the deployable panel 16, 17 has a distal end 20 spaced above the dash 12 in the deployed position.

The deployable panel 17 is rotatable about the proximal end 18 from the undeployed position to the deployed position. Specifically, the deployable panel 17 is rotatable about the proximal end 18 from an undeployed position to a deployed position under the force of the airbag 22 as the airbag 22 inflates toward the inflated position. The proximal end 18 is engaged with the dash 12 in the deployed position and the airbag 22 rotates the distal end 20 about the proximal end 18 to the deployed position. Specifically, the airbag 22 rotates the distal end 20 upwardly relative to the proximal end 18 and the distal end 20 is spaced above the dash 12 in the deployed position.

With continued reference to FIGS. 10-14, the proximal end 18 is rotatably coupled to the dash 12. As an example, as shown in the example in the FIGS. 10-14, proximal end 18 may be rotatably connected to the airbag housing 40, i.e., indirectly connected to the dash 12 through the airbag assembly 36. As another example, the proximal end 18 may be rotatably connected to the covering 34 of dash 12, as described further below. The proximal end 18 is rotatably connected to the airbag housing 40 or the covering 34 of the dash 12 at a hinge. The hinge may be, for example, a living hinge. The proximal end 18 remains connected relative to the dash 12 when the deployable panel 17 is in the deployed position. In other words, the hinge remains intact connecting the proximal end 18 of the deployable panel 17 to the airbag housing 40 or the covering 34.

In the examples shown in the Figures, the deployable panel 16, 17 and the airbag 22 are below the covering 34 of the dash 12 when the deployable panel 16, 17 is in the undeployed position, e.g., in the cavity 42 below the covering 34. In such an example, inflation of the airbag 22 breaks the covering 34, as shown in the Figures. As another example, for example as a variation of the example shown in FIGS. 3-9B, the deployable panel 16 may be flush with the covering 34 of the dash 12 and may connected to the covering 34 around a perimeter of the cavity 42 and the deployable panel 16. In such an example, the deployable panel 16, 17 may have a class-A surface that matches the class-A surface of the covering 34, e.g., the texture, color, etc. In another example, for example as a variation of the example shown in FIGS. 10-14, a deployable leg 66 of the deployable panel assembly 15 may be flush with the covering 34 of the dash 12 and may be connected to the covering 34 around perimeter of the cavity 42 and the deployable panel 17.

As set forth above, the dash 12, and specifically the covering 34 of the dash 12, may include a tear seam breakable by the airbag 22 as the airbag 22 inflates to the inflated position. The tear seam is designed to rupture upon inflation of the airbag 22. In the examples shown in the Figures, the tear seam is in the covering 34 such that two segments of the covering 34 connected by the tear seam separate upon inflation of the airbag 22. In examples in which the deployable panel 16, 17 or the deployable leg 66 is flush with the covering 34, the tear seam may be between the covering 34 and the deployable panel 16, 17 and/or the deployable leg 66.

As set forth above, the deployable panel 17 is rotatable relative to the dash 12 between the undeployed position and the deployed position. Specifically, the proximal end 18 of the panel is rotatable about a rotational axis R. The deployable panel 17 may be elongated along the rotational axis R. The rotational axis R may be generally parallel with the longitudinal axis A of the dash 12.

With reference to FIGS. 10-14, the deployable panel assembly 14, 15 may include the deployable leg 66 that deploys vehicle-forward of the deployable panel 17 and abuts the covering 34 of the dash 12. The deployable leg 66 extends from the deployable panel 17 in the deployed position and abuts the dash 12 in the deployed position. Specifically, the deployable leg 66 abuts an upper surface of the dash 12, e.g., an upper surface of the covering 34. When the deployable leg 66 abuts the dash 12 in the deployed position, the deployable leg 66 stops rotation of the deployable panel 17 relative to the dash 12 such that the deployable panel 17 operates as the reaction surface 44 for the airbag 22. The deployable leg 66 is rigid relative to the deployable panel 17 to maintain the position of the deployable panel 17 relative to the dash 12 against the forces of the airbag 22 during inflation of the airbag 22 toward the inflated position and while the airbag 22 is in the inflated position, including while the airbag 22 controls the kinematics of the occupant during certain vehicle impacts. For example, the deployable leg 66 is sized, shaped, and of material type to be rigid relative to the deployable panel 17.

The deployable leg 66 and the deployable panel 17, when in the deployed position, may have a triangular shape. Specifically, the deployable panel 17 is one leg of the triangular shape and the deployable leg 66 forms the other two legs of the triangular shape. The deployable leg 66 may includes a lower segment 68 extending from the proximal end 18 of the deployable panel 17 along the dash 12 in the deployed position and an upper segment 70 extending from the distal end 20 of the deployable panel 17 downwardly to the lower segment 68 in the deployed position. In such an example, the lower segment 68 is connected to the proximal end 18 of the deployable panel 17 and the upper segment 70 in both the undeployed position and the deployed position, and the upper segment 70 is connected to the distal end 20 of the deployable panel 17 and the lower segment 68 in both the undeployed position and the deployed position. The deployable panel 17, the upper segment 70, and the lower segment 68 are connected to each other in any suitable fashion, e.g., living hinges.

The lower segment 68 may include a fold 72 when the deployable panel 17 is in the undeployed position. The fold 72 unfolds as the airbag 22 rotates the deployable panel 17 from the undeployed position to the deployed position. The fold 72 of the lower segment 68 in the undeployed position and unfolding to the deployed position allows for minimized packaging of the deployable leg 66 in the undeployed position and maximized extension of the deployable leg 66 from the deployable panel 17 in the deployed position. As an example, the fold 72 may include a living hinge. The fold 72 is designed to unfold as the deployable panel 17 rotates from the undeployed position to the deployed position.

In the example shown in FIGS. 10-14, the tether 24 is connected to the impact panel 48 such that the impact panel 48 exerts an upward force from the airbag 22 to the deployable panel after the airbag 22 has extended from the cavity 42 and continues to inflate to the inflated position. During inflation of the airbag 22, the impact panel 48 may experience high inflation forces that are transferred to the deployable panel 17 by the tether 24 during inflation of the airbag 22. Specifically, during inflation of the airbag 22, the impact panel 48 may receive the highest inflation forces relative to other portions of the airbag 22.

The tether 24 extends through the back panel 46 of the airbag 22 from the deployable panel 48 to the impact panel 46. Specifically, the tether 22 extends through the inflation chamber of the airbag 22 from the back panel 46 to the impact panel 48. The tether 22 may extend through a slit in the back panel 46. The tether 24 may be stitched to the back panel 46 at the slit. The airbag 22 may be generally fluidly sealed at the slit to prevent exhaust of inflation medium from the inflation chamber at the slit.

The tether 24 is connected to the impact panel 48 of the airbag 22 in any suitable fashion. As an example, the tether 24 may be stitched, ultrasonically welded, adhered, etc., to the impact panel 48. The tether 24 may be connected to the impact panel 48 in the inflation chamber, i.e., on the side of the impact panel 48 that faces the inflation chamber.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a dash including an upper surface;
   a deployable panel supported by the dash and moveable relative to the dash from an undeployed position to a deployed position, the deployable panel having a proximal end at the dash in the deployed position and a distal end spaced above the dash in the deployed position; the distal end rotating about the proximal end from the undeployed position to the deployed position;
   an airbag supported by the dash and inflatable to an inflated position, the airbag abutting the deployable panel when the deployable panel is in the deployed position and the airbag is in the inflated position;
   a tether extending from the airbag to the deployable panel in the deployed position; and
   a deployable leg extending from the deployable panel and abutting the dash in the deployed position, the deployable panel is between the airbag and the deployable leg;
   the deployable leg and the deployable panel together forming a triangular shape.

2. The assembly as set forth in claim 1, wherein the tether is flexible relative to the deployable panel.

3. The assembly as set forth in claim 1, wherein the tether is fabric.

4. The assembly as set forth in claim 1, wherein the tether is positioned to transmit upward force from the airbag to the deployable panel to raise the deployable panel toward the deployed position as the airbag inflates to the inflated position.

5. The assembly as set forth in claim 1, wherein the tether is connected to the distal end of the deployable panel.

6. The assembly as set forth in claim 1, wherein the deployable panel in the deployed position is rigid relative to the airbag in the inflated position.

7. The assembly as set forth in claim 1, further comprising a windshield, the deployable panel being between the airbag and the windshield.

8. The assembly as set forth in claim 1, wherein the distal end and the proximal end of the deployable panel are adjacent the dash in the undeployed position.

9. The assembly as set forth in claim 1, wherein the proximal end is engaged with the dash in the undeployed position and the deployed position.

10. The assembly as set forth in claim 1, wherein the deployable panel is one leg of the triangular shape and the deployable leg forms two legs of the triangular shape.

11. The assembly as set forth in claim 10, wherein the deployable leg in the deployed position includes a lower segment extending from the proximal end of the deployable panel along the upper surface of the dash and an upper segment extending from the distal end of the deployable panel downwardly to the lower segment.

12. The assembly as set forth in claim 11, wherein the lower segment abuts the upper surface of the dash from the proximal end of the deployable panel to the upper segment of the deployable leg.

13. The assembly as set forth in claim 11, wherein the lower segment includes a fold when the deployable panel is in the undeployed position.

14. The assembly as set forth in claim 13, wherein the fold includes a living hinge.

\* \* \* \* \*